United States Patent
Wu et al.

(10) Patent No.: US 11,829,714 B2
(45) Date of Patent: *Nov. 28, 2023

(54) CONSTRUCTING ANSWERS TO QUERIES THROUGH USE OF A DEEP MODEL

(71) Applicant: Microsoft Technology Licensing, LLC, Redmond, WA (US)

(72) Inventors: Xiaojian Wu, Fremont, CA (US); Doran Chakraborty, San Jose, CA (US); Hyun-Ju Seo, Los Gatos, CA (US); Sina Lin, Stanford, CA (US); Gangadharan Venkatasubramanian, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,548

(22) Filed: Oct. 13, 2022

(65) Prior Publication Data
US 2023/0031608 A1 Feb. 2, 2023

Related U.S. Application Data

(63) Continuation of application No. 16/443,858, filed on Jun. 17, 2019, now Pat. No. 11,475,216.

(51) Int. Cl.
| | |
|---|---|
| *G06F 40/205* | (2020.01) |
| *G06F 16/9532* | (2019.01) |
| *G06F 16/33* | (2019.01) |
| *G06F 40/30* | (2020.01) |
| *G06N 3/049* | (2023.01) |

(52) U.S. Cl.
CPC ........ *G06F 40/205* (2020.01); *G06F 16/3344* (2019.01); *G06F 16/9532* (2019.01); *G06F 40/30* (2020.01); *G06N 3/049* (2013.01)

(58) Field of Classification Search
None
See application file for complete search history.

(56) References Cited

U.S. PATENT DOCUMENTS

| | | |
|---|---|---|
| 10,180,964 B1 | 1/2019 | Baker et al. |
| 10,803,507 B1 | 10/2020 | Verma et al. |
| 2010/0312537 A1 | 12/2010 | Rayan et al. |
| 2012/0166973 A1 | 6/2012 | Gurevich et al. |
| 2014/0101163 A1 | 4/2014 | Adams et al. |
| 2015/0242512 A1 | 8/2015 | Lindahl et al. |
| 2019/0205384 A1 | 7/2019 | Zhu et al. |

(Continued)

OTHER PUBLICATIONS

Pennington, et al., "Glove: Global Vectors for Word Representation", In Proceedings of the 2014 Conference on Empirical Methods in Natural language Processing, Oct. 25, 2014, pp. 1532-1543.

(Continued)

*Primary Examiner* — Thu N Nguyen
(74) *Attorney, Agent, or Firm* — CALFEE, HALTER & GRISWOLD LLP

(57) ABSTRACT

Various technologies relating to constructing an answer to a query are described herein, wherein the answer is in list form. The answer includes a header and a list element. A deep model receives content of a webpage that is deemed relevant to the query by a search engine and constructs the answer to the webpage upon receipt of the query.

20 Claims, 8 Drawing Sheets

(56) References Cited

U.S. PATENT DOCUMENTS

2019/0205445 A1    7/2019   Yazdani et al.
2020/0394260 A1   12/2020   Wu et al.

OTHER PUBLICATIONS

Buber, et al., "Web Page Classification Using RNN", In Journal of Procedia Computer Science, vol. 154, Jan. 1, 2019, pp. 62-72.
Gao, et al., "Neural Approaches to Conversational AI", In Journal of Computing Research Repository, Dec. 13, 2018, 95 Pages.
"International Search Report and the Written Opinion Issued in PCT Application No. PCT/US2020/030003", dated Jun. 22, 2020, 11 Pages.
"Office Action for U.S. Appl. No. 16/443,858", dated Sep. 28, 2021, 11 pages.
"Response to the Office Action for U.S. Appl. No. 16/443,858", filed Feb. 28, 2022, 17 pages.
"Notice of Allowance and Fees Due for U.S. Appl. No. 16/443,858", dated Jun. 15, 2022, 7 pages.

CONSTRUCTING ANSWERS TO QUERIES THROUGH USE OF A DEEP MODEL

RELATED APPLICATION

This application is a continuation of U.S. patent application Ser. No. 16/443,858, filed on Jun. 17, 2019, and entitled "CONSTRUCTING ANSWERS TO QUERIES THROUGH USE OF A DEEP MODEL", the entirety of which is incorporated herein by reference.

BACKGROUND

Computer-implemented search engines are configured to receive queries and identify webpages that are deemed by the search engine as including content that is relevant to the received queries. In operation, a conventional search engine receives a query from a client computing device, searches over an index of webpages based upon the query to identify a plurality of webpages that are relevant to the query, and thereafter ranks the plurality of webpages based upon features of the query and features of the plurality of webpages. The search engine then constructs a search engine results page (SERP) and causes the SERP to be transmitted to the client computing device from which the query was received. The SERP includes a ranked list of search results, wherein the search results represent the webpages.

Relatively recently, search engines have been configured to directly provide answers to fact-based questions; for example, when a query "George Washington's birthday" is received from a client computing device, the search engine can return an answer to the query (Feb. 22, 1732) as part of a SERP to the client computing device, wherein the SERP also includes a ranked list of search results. Hence, a user who submitted the query need not select a hyperlink on the SERP to acquire the answer to the query.

In addition, for certain queries, conventional search engines have been configured to return an answer in the form of a list. For example, when a conventional search engine receives the query "most populated countries in the world", the search engine can return a list that includes several list elements, wherein the list elements are identities of countries that have the largest populations from amongst all of the world's countries. Currently, this type of functionality is enabled by constructing lists offline, generating a searchable list index for these lists, and storing the lists in computer-readable storage. Therefore, when the search engine receives a query from a client computing device, the search engine searches over the list index to identify one or more lists that are relevant to the query, computes scores for the lists (wherein a score for a list represents how relevant the list is to the query), compares the highest score from amongst the scores with a predefined threshold, includes a list with the highest score in a SERP when the highest score is above the predefined threshold, and returns the SERP (with the list included) to the client computing device.

There are several problems with the conventional approach for providing list answers. For example, constructing and approving list answers currently requires a significant amount of manual labor, and thus currently list answers are only available for a relatively small number of queries. Additionally, list answers can become stale relatively quickly. For instance, an answer to the query "players with the most home runs this year" may change quite often. Using the conventional approach described above, however, the search engine generates these lists off-line and thus the search engine is either unable to answer such query or may provide a stale answer to the query.

SUMMARY

The following is a brief summary of subject matter that is described in greater detail herein. This summary is not intended to be limiting as to the scope of the claims.

Described herein are various technologies pertaining to a computing system that is configured to construct, from documents (e.g., webpages) that are searchable by the computing system, answers to queries at runtime in response to receiving the queries. More specifically, and in an example, a search engine receives a query from a client computing device and identifies a plurality of webpages that include content that is germane to the query. The search engine ranks these webpages to generate a ranked list of webpages and retrieves the top N (e.g., the top five) webpages in the ranked list of webpages. The search engine can retrieve the top N webpages from a cache maintained by the search engine and/or from web servers that respectively host the webpages.

To reduce latency in constructing an answer to the query, for each of the retrieved webpages, the search engine generates several representations of the webpage through use of a plurality of webpage partitioning rules. For example, a first webpage partitioning rule can require that a first webpage representation consists of all headers of the webpage and a first sentence after each header; a second webpage partitioning rule can require that a second webpage representation consists of list(s) (defined by list tags in HTML, code of the webpage) in the webpage and sentences that immediately precede and follow the list(s); a third webpage partitioning rule can require that a webpage representation consists of table(s) in a webpage, title(s) of the table(s), and sentence(s) that immediately precede the table(s) in the webpage. Accordingly, the search engine can construct several nonidentical representations of the webpage, wherein each representation includes less than an entirety of the content of the webpage.

Responsive to constructing the representations of the webpage, the search engine processes the representations of the webpage in parallel to ascertain whether one or more of the representations of the webpage include an answer to the query. For each webpage representation, the search engine delineates boundaries of fragments in the webpage representation, wherein exemplary fragments include sentences, phrases (such as headers that stand alone but are not complete sentences), titles, and the like. For example, the search engine can utilize natural language processing (NLP) technologies over these webpage representations to delineate boundaries of the fragments, can employ a rules-based approach to delineate boundaries of the fragments (e.g., identify a paragraph break as noting a fragment boundary, identify a period as being a fragment boundary, etc.).

The search engine includes a deep model, and the fragments of the webpage representation are provided to the deep model (e.g., in sequence). The deep model is configured to ascertain whether the webpage representation includes an answer to the query and output an answer when the webpage representation includes the answer. Summarily, the deep model is configured to scan each webpage representation of the webpage and determine whether the webpage representation includes an answer to the query. When the webpage representation includes an answer to the query (in the form of a list), the deep model outputs an overall score for the answer that is indicative of a confidence that the answer properly addresses the query. When the score for the answer is below a predefined threshold, the search engine discards the answer. It can be ascertained that the deep model can output multiple answers to the query, with each answer having a score that is at or above the predefined threshold. The search engine, in such case, selects the answer with the highest score as the "best" answer, and includes such answer in the SERP. When the deep model does not output an answer with a score that is at or above the predefined threshold, the search engine fails to include an answer in the SERP.

As indicated previously, the answer can be in the form of a list, wherein the list includes a header (that is descriptive of content of the list) and several list elements. In an exemplary embodiment, the deep model constructs the list by selecting fragments of a webpage representation to include as adjacent elements in the list, wherein the fragments are not adjacent to one another in the webpage.

The search engine described herein offers various improvements over conventional search engines. In contrast to the conventional approach, where answers in list form are constructed offline, the search engine described herein is configured to construct answers in list form at runtime in response to receipt of a query, thereby ensuring that the answer is not stale. In addition, the search engine is configured to construct an answer in list form, where adjacent elements in the answer can be selected by the search engine from non-adjacent regions in the webpage.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
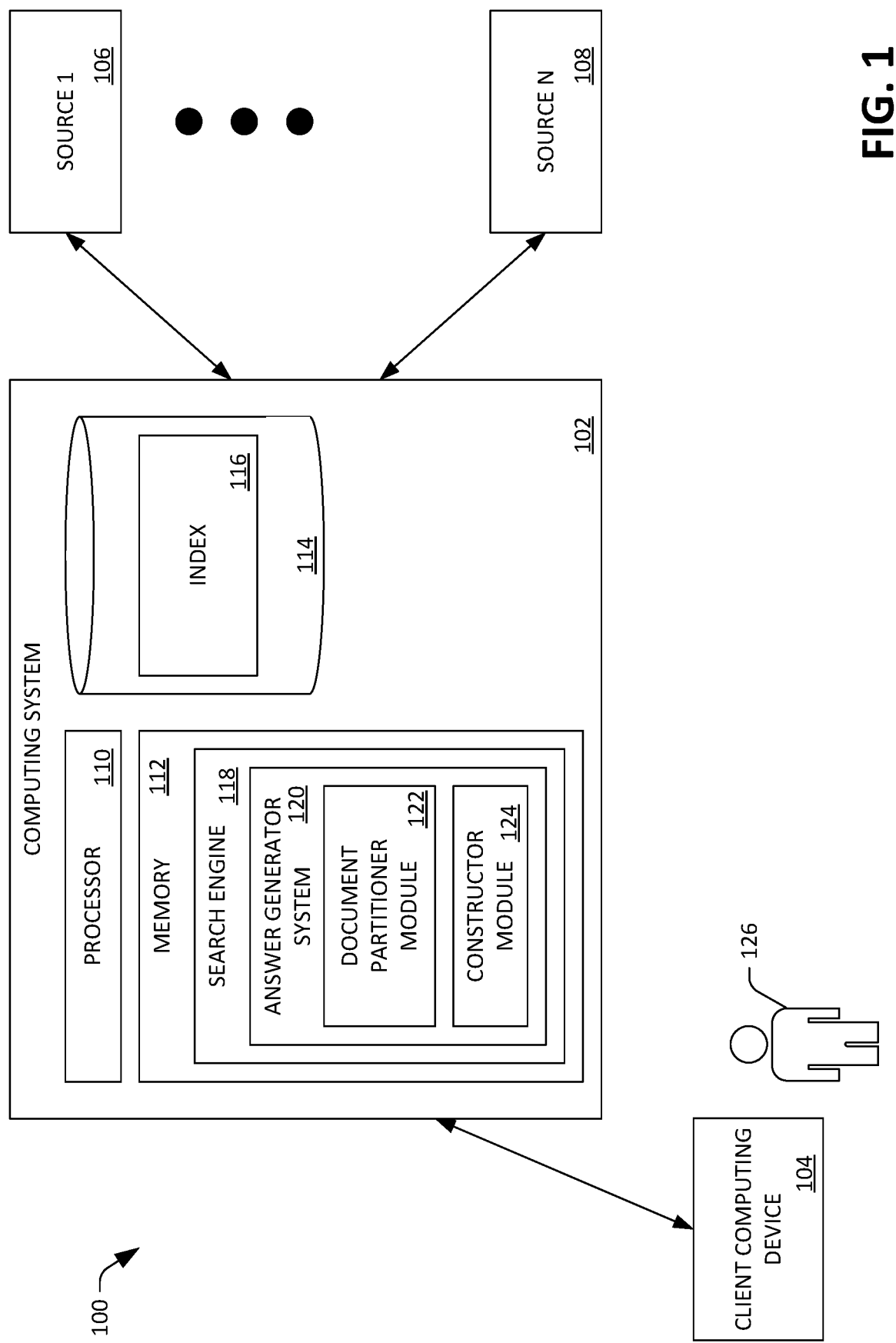
FIG. 1 is a functional block diagram of an exemplary system that is configured to construct answers to queries based upon contents of webpages.

Various technologies pertaining to constructing answers to queries at runtime are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices. Further, as used herein, the term "exemplary" is intended to mean serving as an illustration or example of something and is not intended to indicate a preference.

Described herein are various technologies pertaining to constructing answers to queries based upon contents of webpages, wherein the answers are constructed at runtime by processing content of webpages identified as being relevant to the queries. A constructed answer can be in the form of a list or table, wherein the list includes a header and one or more list elements and the table includes at least one table row. Further, the technologies described herein allow for constructing an answer in list or table form, wherein the answer includes a first list or table element and a second list or table element that are adjacent to one another in the answer but are not adjacent to one another in the webpage used to construct the answer. While the examples described herein relate to constructing answers based upon content of webpages, it is to be understood that the technologies described herein are also well-suited for constructing answers based upon content of other types of documents, such as emails, word processing documents, and the like.

With reference to FIG. 1, a functional block diagram of an exemplary system 100 that is configured to construct an answer to a query is illustrated. The system 100 includes a computing system 102 and a client computing device 104, wherein the computing system 102 is in communication with the client computing device 104 by way of a network (e.g., the Internet). The system 100 additionally includes a plurality of sources 106-108, wherein the sources 106-108 can store webpages or other suitable documents. Thus, the sources 106-108, for instance, can be web servers that host webpages.

The computing system 102 includes a processor 110 and memory 112 that has instructions stored therein that are executed by the processor 110. The computing system 102 additionally comprises a data store 114, wherein the data store 114 can include an index 116, wherein the index 116 indexes webpages that are available by way of the World Wide Web (e.g., wherein the webpages are hosted by the sources 106-108).

The memory 112 has a search engine 118 loaded therein that is configured to search over the index 116 in response to receipt of a query. The search engine 118 includes an answer generator system 120 that is configured to generate answers to queries received by the search engine 118. As will be described in detail below, the answer generator system 120 is configured to, at runtime and in response to receipt of a query, process a webpage and construct an answer to the query based upon content of the webpage. This is in contrast to conventional approaches—in conventional approaches, answers are constructed offline and search engines return answers to queries by searching over indexes that index such previously constructed answers.

The answer generator system 120 includes a document partitioner module 122 that it is configured to receive a webpage and generate multiple nonidentical representations of the webpage. For example, the document partitioner module 122 can generate a first representation of the webpage that consists of headers in the webpage and can additionally generate a second representation of the webpage that consists of lists included in the webpage (and does not include headers of the webpage).

The answer generator system 120 additionally includes a constructor module 124 that is configured to construct answers to the query based upon content of the representations of the webpage generated by the document partitioner module 122. As will be described in greater detail below, the constructor module 124 includes a computer-implemented deep model that comprises several recurrent neural networks (RNNs), wherein the deep model is configured to process a representation of a webpage and construct an answer to the query based upon content of the representation of the webpage.

As described previously, the constructor module 124 can construct the answer in the form of a list or table. The list can include a header and several list elements, wherein the header describes overall content of the list and the list elements are elements of the list. The table can include at least one table row. Thus, for example, when the search engine 118 receives the query "most home runs in baseball this year", the constructor module 124 can construct an answer to the query, wherein the answer is in the form of a list or a table. When the answer is in the form of a list, the header of the list may be "home runs in 2019", a first element of the list can be a name of a first baseball player and a number of home runs hit by the first baseball player, a second element of the list can be a name of a second baseball player and a number of home runs hit by the second baseball player, and so forth. In the webpage from which the answer is constructed by the constructor module 124, however, the name of the first baseball player and the name of the second baseball player may not be immediately adjacent to one another. For example, biographical text may separate the name of the first player from the name of the second player. The constructor module 124, however, nevertheless is able to construct the answer, which includes the first two list elements described above, despite the names of the first player and the second player being separated by text in the webpage from which the answer was constructed.

Exemplary operation of the system 100 is now set forth. A user 126 of the client computing device 104 sets forth a query to the client computing device 104 and the client computing device 104 transmits the query (by way of the network) to the computing system 102. The search engine 118 receives the query and searches the index 116 for webpages that are germane to the received query. Hence, the search engine 118 can identify a plurality of webpages that are relevant to the query. The search engine 118 then computes relevance scores for the plurality of webpages based upon features of the webpages and/or features of the received query. The search engine 118 ranks the webpages based upon the relevance scores, where the higher the relevance score for a webpage the more relevant the search engine has deemed the webpage to the query.

The answer generator system 120 can select a threshold number of webpages with the highest relevance scores assigned thereto by the search engine 118. For instance, the answer generator system 120 can select the most highly ranked webpage (the webpage with the highest relevance score assigned thereto). In another example, the answer generator system 120 can select the five most highly ranked webpages (the five webpages with the five highest relevance scores assigned thereto). The answer generator system 120 can then retrieve the selected webpage(s) from the appropriate sources 106-108. As indicated previously, the sources 106-108 may be web servers that host the webpages. Additionally or alternatively, the answer generator system 120 can retrieve one or more of the selected webpages from a cache of the search engine 118.

Each retrieved webpage is provided to the document partitioner module 122. With respect to a retrieved webpage, the document partitioner module 122 generates several representations of the webpage through use of a plurality of webpage partitioning rules. For example, the document partitioner module 122 can construct a first representation of the webpage that consists of first sentences of paragraphs of the webpage. The document partitioner module 122 can construct a second representation of the webpage that consists of last sentences of paragraphs of the webpage. In addition, the document partitioner module 122 can construct a third representation of the webpage that consists of headers of the webpage and sentences that immediately follow such headers. In still yet another example, the document partitioner module 122 can construct a fourth representation of the webpage that consists of lists in the webpage (e.g., identified by list tags in HTML code of the webpage) and sentences that immediately precede the lists in the webpage. The above examples are not to be interpreted as being limiting—it can be ascertained that the document partitioner module 122 can construct several nonidentical representations of each webpage provided to the document partitioner module 122. Further, the document partitioner module 122 may be optional in the computing system 102, as the webpage representations are constructed to reduce latency in connection with generating answers from content of webpages. More specifically, as will be described in greater detail below, the constructor module 124 is configured to process content of documents provided to the constructor module, and a relatively large amount of processing cycles (and thus time) may be required to process a webpage that includes a significant amount of content. The webpage representations generated by the document partitioner module 122 have less content than an entirety of the webpage and can be processed in parallel by the constructor module 124.

The constructor module 124 receives each webpage representation generated by the document partitioner module 122 and ascertains whether the webpage representation includes an answer to the query. With more particularity, and in an example, the constructor module 124 processes content of a webpage representation an answer to the query, wherein the answer is in list form. The answer generator system 120 computes a confidence score for the answer, wherein the confidence score is indicative of a confidence that the answer is a suitable answer for the query. The constructor module 124 can compare the confidence score with a predefined threshold, and when the confidence score is beneath such threshold, can indicate that the webpage representation does not include an answer to the query. When the confidence score for the answer meets or exceeds the predefined threshold, the answer generator system 120 compares the confidence score with other confidence scores assigned to other answers by the constructor module 124, wherein the other answers are generated based upon other representations of the webpage and have confidence scores assigned thereto that meet or exceed the predefined threshold. The answer generator system 120 selects the answer with the highest confidence score assigned thereto and causes the search engine 118 to include the answer in a search engine results page (SERP) that is returned to the client computing device 104. When no answer has a confidence score that meets or exceeds the threshold, the answer generator system 120 can output an indication that no answer is to be returned as part of a search engine results page (SERP) that is to be provided to the client computing device 104. As will be described in greater detail herein, the constructor module 124 constructs an answer for a representation of the webpage by first performing word encoding for words in a fragment of the representation of the webpage, followed by performing sentence embedding, followed by performing semantic analysis of the embedded sentences relative to the received query.

As noted previously, while the system 100 has been described as including a search engine that is configured to retrieve webpages, aspects described herein are also well-suited for constructing answers from content of other types of documents. For example, the answer generator system 120 can be utilized in an email search system to construct answers to queries, wherein the answers are constructed based upon content of email documents. In another example, the answer generator system 120 can be employed in a local search system that is configured to construct answers to queries, wherein the answers are constructed based upon content of documents retained in a file system (e.g., word processing documents, spreadsheets, and so forth).

Figure 2:
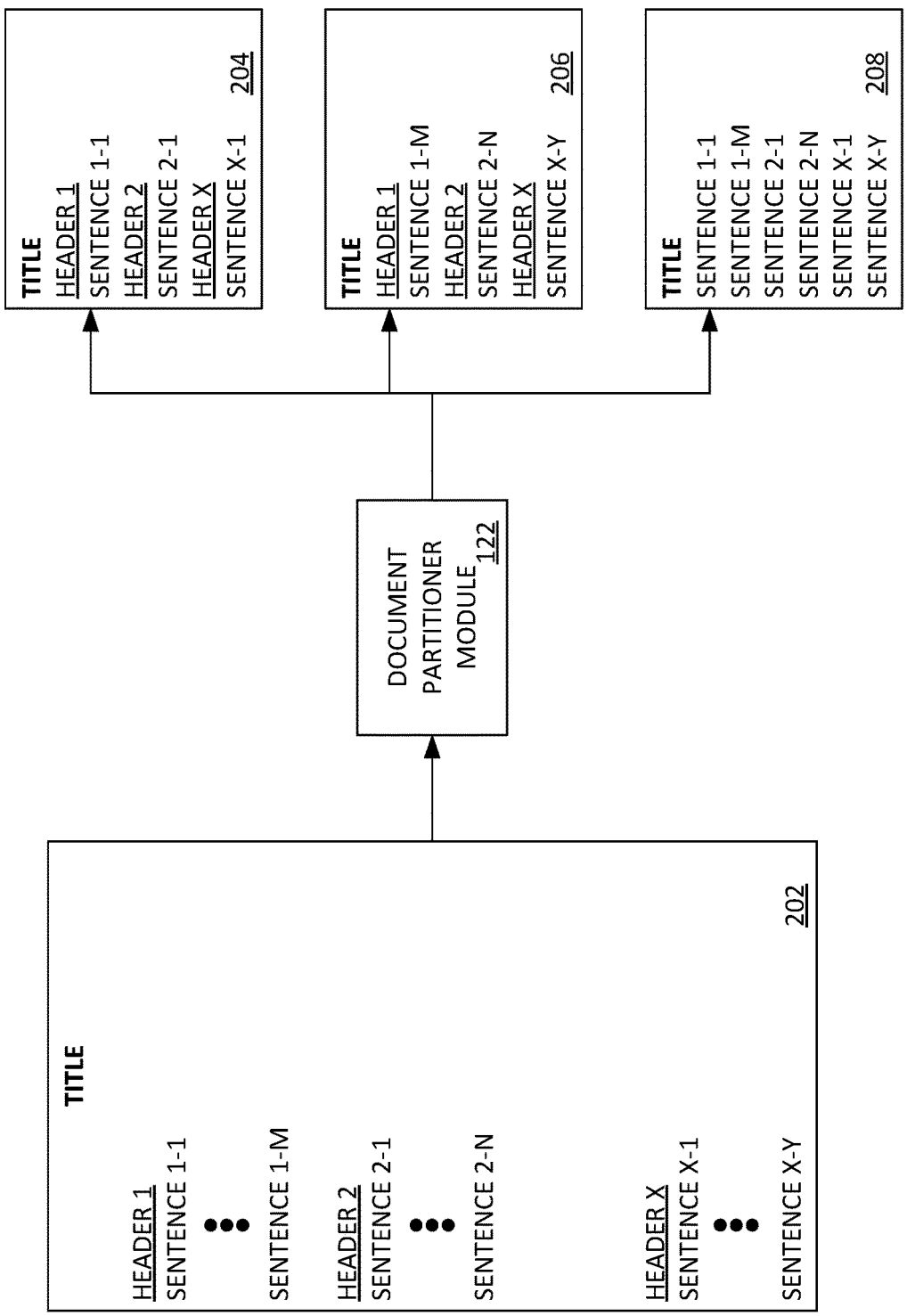
FIG. 2 is a schematic that depicts partitioning of a webpage into several nonidentical representations of the webpage.

Now referring to FIG. 2, a schematic that illustrates operation of the document partitioner module 122 is illustrated. The document partitioner module 122 receives a webpage 202. The webpage 202 includes a title and X headers, wherein under each of the X headers there is a plurality of sentences. The document partitioner module 122 constructs a plurality of representations 204-208 of the webpage 202 based upon document partitioning rules. As illustrated in FIG. 2, the first webpage representation 204 includes the title of the webpage 202, each of the X headers of the webpage 202, and sentences that immediately follow each header. The second webpage representation 206 is different from the first webpage representation 204. The second webpage representation 206 includes the title of the webpage 202, each header of the webpage 202, and the last sentence underneath each of the headers of the webpage 202. The third webpage representation 208 is different from the first and second webpage representations 204 and 206, respectively. The third webpage representation 208 includes the title of the webpage 202 and the first and last sentences under each of the X headers in the webpage 202.

The webpage representations 204-208 are set forth for purposes of example and are not intended to be limiting, and other webpage representations are contemplated. For instance, the document partitioner module 122 can scan the webpage 202 from the top down and place the scanned content in a representation of the webpage until a certain number of characters are reached, at which time the document partitioner module 122 can create a new representation of the webpage 202. In addition, the document partitioner module 122 can be configured to generate a document representation such that a list or table is not split across different document representations. For example, a list in the webpage 202 can be defined by list tags in HTML of the webpage 202 (<ol> <li> . . . </li> <li> . . . </li> </ol>). The document partitioner module 122 can generate a webpage representation that includes an entirety of the list. Each of the webpage representations 204-208 can be provided to a respective instance of the constructor module 124, such that the webpage representations 204-208 are processed in parallel.

Figure 3:
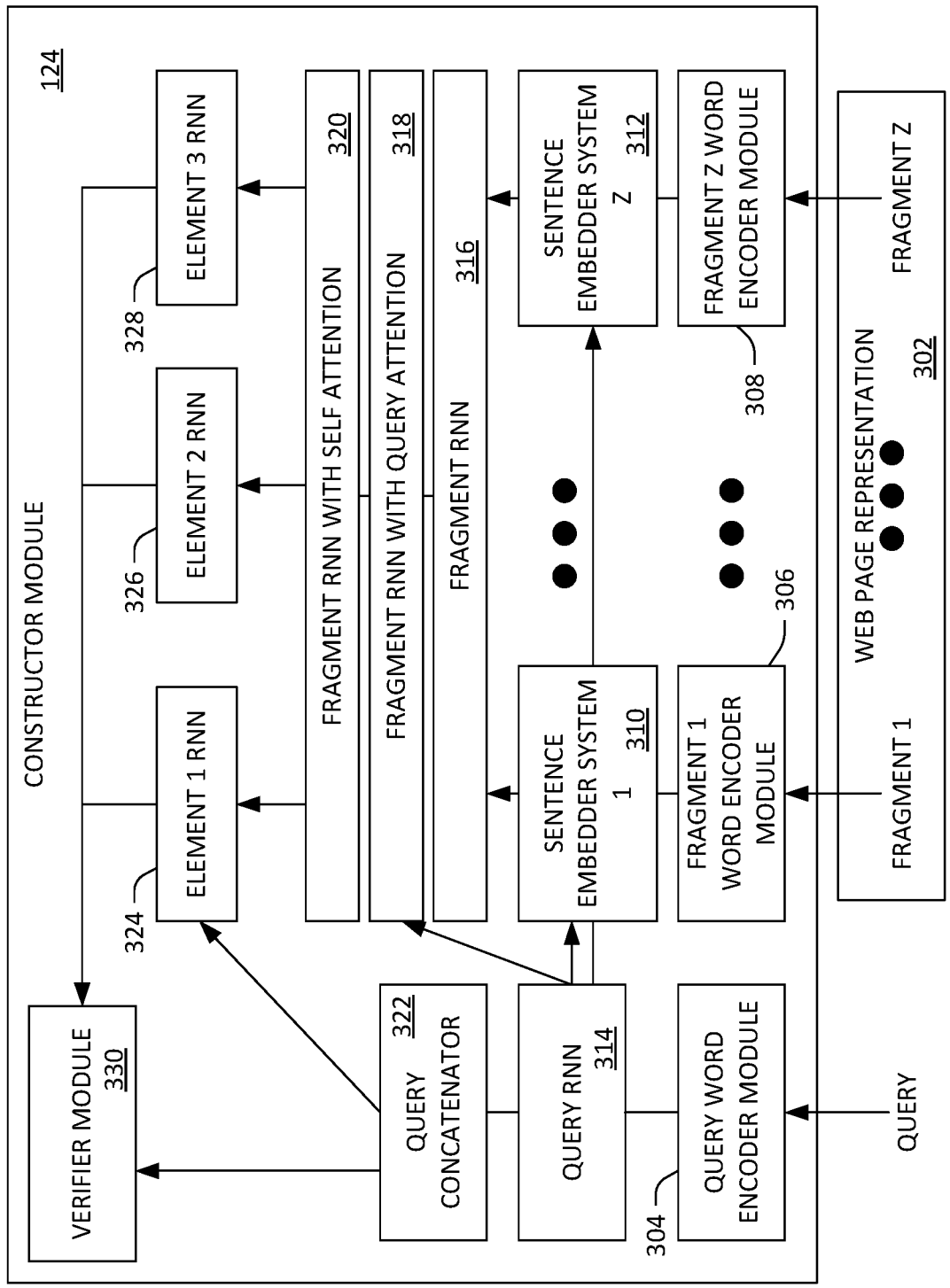
FIG. 3 is a functional block diagram of an exemplary constructor module that is configured to construct answers to queries based upon content of webpages.

Referring now to FIG. 3, a functional block diagram of the constructor module 124 is illustrated. The constructor module 124 is configured to receive a webpage representation 302 and the query received by the computing system 102 from the client computing device 104. The webpage representation 302 includes a plurality of fragments (fragment 1-fragment Z). A fragment can be a sentence, text of a header (which may or may not be a complete sentence), text of a title, a row of a table, or other suitable fragment. Typically, a fragment includes multiple words, although a fragment can include a single word.

The constructor module 124 includes a query word encoder module 304 that is configured to receive the query and encode each word in the query to a fixed-size vector, wherein each vector represents a respective word in the query. Any suitable technique can be employed when encoding a word to a fixed-size vector. An exemplary technique is described in Pennington, et al., "Glove: Global Vectors for Word Representation", In Empirical Methods in Natural Language Processing (EMNLP), pages 1532-1543, 2014. The constructor module 124 further includes a plurality of word encoder modules 306-308, wherein the first word encoder module 306 receives the first fragment of the webpage representation 302 and the Zth word encoder module 308 receives the Zth fragment of the webpage representation 302. The word encoder modules 306-308 are configured to encode words in the fragments of the webpage representation 302 in parallel, with each word in each fragment being encoded as a fixed-size vector. Therefore, for example, when the first fragment includes five words, the first word encoder module 306 receives the five words in sequence and encodes each of the five words into five fixed-sized vectors. Thus, output of the first word encoder module 306 is a sequence of the five fixed-sized vectors.

The constructor module 124 additionally includes a plurality of sentence embedder systems 310-312 that are configured to perform sentence embedding with respect to the sequences of vectors respectively output by the word encoder modules 306-308. Continuing with the example set forth above, when the first fragment of the webpage representation 302 includes five words, the word encoder module 306 outputs a sequence of five vectors and the first sentence embedder system 310 receives the five vectors in sequence. The first sentence embedder system 310, which will be described in greater detail below, outputs a fixed-size vector that is an encoding of the first fragment of the webpage representation 302.

The constructor module 124 also includes a query RNN 314 that receives the sequence of fixed-sized vectors output by the query word encoder module 304. The output of the query RNN 314 is another sequence of fixed-size vectors, wherein each fixed-size vector represents a word in the query given the context of the word in the query (e.g., a meaning of a word is often dependent upon what other words co-occur with the word in a fragment). The sentence embedder systems 310-312 receive output of the query RNN 314 and perform sentence embedding based upon the output of the query RNN 314. For instance, the sentence embedder systems 310-312 can include an RNN that has an attention mechanism, wherein attention is provided to the encodings output by the query RNN 314.

As noted above, the first sentence embedder system 310 outputs a first fixed-length vector that is an encoding of the first fragment of the webpage representation 302. Additionally, the Zth sentence embedder system 312 outputs a Zth fixed-length vector that is an encoding of the Zth fragment of the webpage representation. The constructor module 124 additionally optionally comprises a fragment RNN 316 that receives the fixed-length vectors output by the sentence embedder systems 310-312 in sequence. The fragment RNN 316 is configured to output a sequence of fixed-length vectors that encode the fragments of the webpage representation 302 given the context of the fragments in the webpage representation. Similar to a word having a meaning that depends upon what other words co-occur with the word in a fragment, a meaning of a fragment is dependent upon other fragments that co-occur with the fragment in a webpage representation.

The constructor module 124 also optionally comprises a fragment RNN with query attention 318, wherein the fragment RNN with query attention 318 receives the sequence of fixed-length vectors output by the fragment RNN 316 and outputs another sequence of fixed-length vectors that respectively encode the fragments of the webpage representation. Alternatively, the fragment RNN with query attention 318 can receive output of the sentence embedder systems 310-312 directly from the sentence embedder systems 310-312. The fragment RNN with query attention 318 has an attention mechanism and attends to encodings output by the query RNN 314. The fragment RNN with query attention 318 outputs yet another sequence of fixed-length vectors, wherein such fixed-length vectors are respective encodings of the fragments of the webpage representation 302. The constructor module 124 also optionally includes a fragment RNN with self-attention 320, which receives the sequence of vectors output by the fragment RNN with query attention 318 and outputs yet another sequence of vectors that are yet other encodings of the fragments of the webpage representation 302. Thus, the fragment RNN with self attention 320 has an attention mechanism that attends to itself.

While the constructor module 124 is illustrated as including the fragment RNN 316, the fragment RNN with query attention 318, and the fragment RNN with self attention 320, it is to be understood that the constructor module 124 may include only one of such RNNs or a combination of the RNNs, and the arrangement of the RNNs can be altered. For example, the constructor module 124 may not include the fragment RNN 316, and the fragment RNN with self attention 320 may receive the output of the sentence embedder systems 310-312 and feed into the fragment RNN with query attention 318.

The constructor module 124 also includes a query concatenator 322 that performs max-mean pooling on the sequence of vectors output by the query RNN 314, such that the query concatenator 322 outputs a vector of a length that matches lengths of vectors output by the fragment RNNs 316-320. The vector output by the query concatenator 322 is an encoding of the query received from the client computing device 104.

The constructor module 124 further comprises a plurality of element RNNs 324-328, wherein the element RNNs 324-328 correspond to portions of a potential answer in list form. For example, the first element RNN 324 can correspond to a header of a list, the second element RNN 326 can correspond to a first list element of the list, and the second element RNN 328 can correspond to a second list element of the list. Similarly, the first element RNN 324 can correspond to a first row of a table answer, the second element RNN 326 can correspond to a second row of the table answer, and the third element RNN 328 can correspond to a third row of the table answer. It is to be understood that the constructor module 124 can include more element RNNs than the three element RNNs 324-328 illustrated in FIG. 3. The first element RNN 324 receives the sequence of vectors output by the fragment RNN 316, the fragment RNN with query attention 318, or the fragment RNN with self attention 320. The first element RNN 324 additionally has an attention mechanism, such that the first element RNN 324 attends to the vector output by the query concatenator 322. The first element RNN 324 outputs scores that respectively correspond to the vectors in the sequence of vectors received from one of the RNNs 316-318, wherein a score in the scores is indicative of a probability that a fragment that corresponds to the score is to be included as the header of the answer (or as the first row of a table answer). The second element RNN 326 operates similarly to the first element RNN 324, in that the second element RNN 326 receives the vectors output by one of the RNNs 316-320 and outputs scores that are indicative of probabilities that fragments represented by the vectors are to be a first list element in the answer (and placed immediately beneath the header) or a second table row. Attention weights are shared between the first element RNN 324, the second element RNN 326, and the third element RNN 328. The third element RNN 328 operates similarly to the first element RNN 324 and the second element RNN 326, but output scores that are indicative of probabilities that the fragments represented by the vectors are to be a second list item in the answer or a third table row.

Accordingly, the first element RNN 324 can output a first probability distribution over the Z sentence fragments of the webpage representation 302, the second element RNN 326 can output a second probability distribution over the Z sentence fragments of the webpage representation 302, and the third element RNN 328 can output a third probability distribution over Z the sentence fragments of the webpage representation 302 $t$. The constructor module 124 identifies a candidate answer based upon the probability distributions.

The constructor module 124 further comprises a verifier module 330 that receives the outputs (probability distributions) of the element RNNs 324-328 in sequence and generates adjusted probabilities, wherein the adjusted probabilities account for the possibility of none of the fragments being suitable as a portion of the answer that corresponds to the element RNNs 324-328. More specifically, the verifier module 330 receives the output of the first element RNN 324 and also receives the encoded query output by the query concatenator 322. The verifier module 330 computes adjusted probabilities, wherein the adjusted probabilities include a probability, for each of the Z fragments, that such fragment is (for example) a header of a list answer, and wherein the adjusted probabilities also include a "no answer" probability. The "no answer" probability that none of the Z fragments is the header of the list answer, When the probability of "no answer", as computed by the verifier module 330, is above a predefined threshold, the constructor module 124 outputs that the webpage representation 302 does not include a suitable answer. Otherwise, the verifier module 330 selects the fragment with the highest probability, and receives the output of the second element RNN 326 and the encoded query output by the query concatenator 322. Thus, in effect, the constructor module 124 dynamically determines how many list elements (or table rows), if any, to include in an answer based upon the webpage representation 302.

As indicated previously, the answer generator system 120 can include multiple instances of the constructor module 124, wherein the instances of the constructor module 124 process webpage representations in parallel. Accordingly, multiple instances of the constructor module 124 may output multiple candidate answers. The answer generator system 120 selects a final answer to be included in the SERP generated by the search engine 118 based upon probabilities output by the verifier module 330. The search engine 118 includes the answer in the SERP and transmits the SERP to the client computing device 104. When there is no candidate answer (as determined by the verifier module 330), the answer generator system 120 outputs an indication that no answer is to be included in the SERP, and the search engine 118 transmits the SERP (with no answer therein) to the client computing device 104.

In summary, then, the word encoder modules 306-308 are each configured to receive words of a fragment (e.g., a sentence) of the webpage representation 302 and generate a sequence of encoded words (a sequence of fixed-length vectors). The sentence embedder systems 310-312 are each configured to receive a sequence of encoded words and generate an encoded fragment (with attention given to the words in the query). The RNNs 316-320 are configured to further encode the fragments, wherein the further encoded fragments represent the fragments in context in the webpage representation 302. The element RNNs 324-328 act to compare these further encoded fragments with the query to ascertain a probability distribution over fragments of the webpage representation 302 as to which of the fragments is to server as the portion of the answer that corresponds to each of the element RNNs. Finally, the verifier module 330 computes adjusted probabilities, taking into account that "no answer" may be the best outcome.

Figure 4:
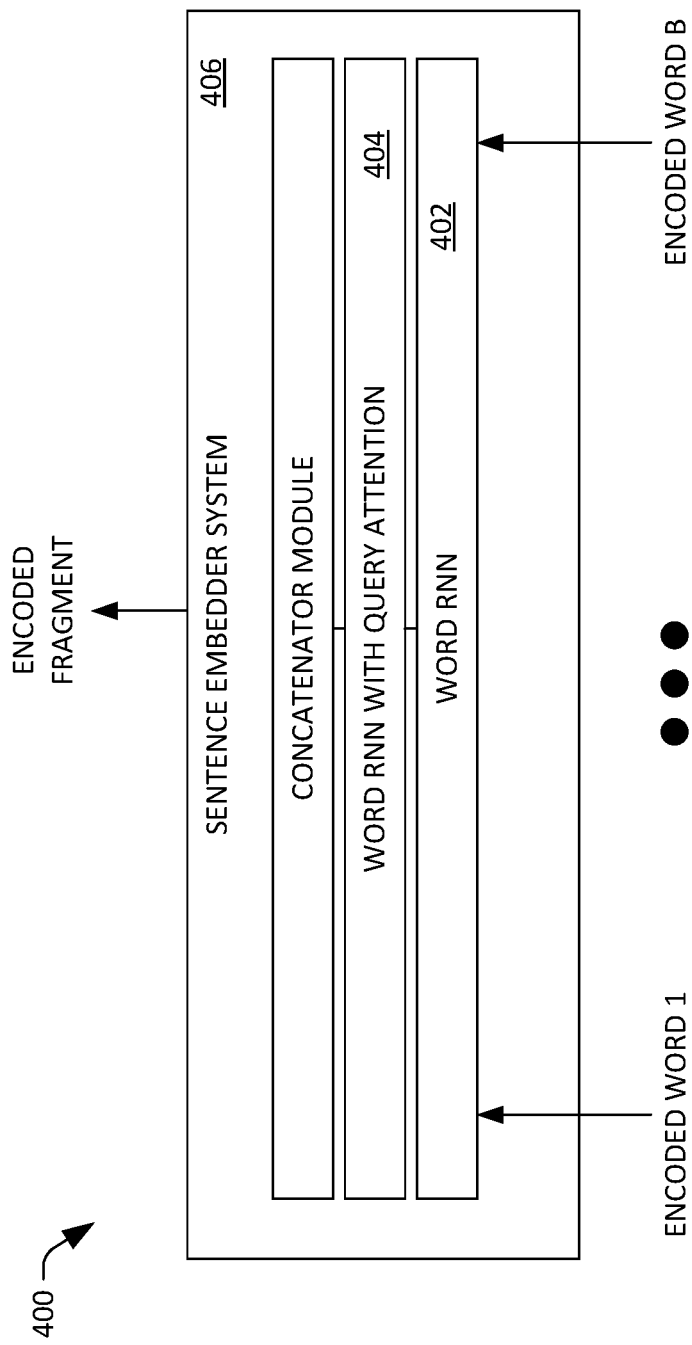
FIG. 4 is a functional block diagram of an exemplary sentence embedder system that is configured to perform sentence embedding based upon a sequence of encoded words.

Now referring to FIG. 4, a functional block diagram of an exemplary sentence embedder system 400 is illustrated, wherein the sentence embedder system 400 can be any of the sentence embedder systems 310-312 illustrated in FIG. 3. The sentence embedder system 400 includes at least one of a word RNN 402 or a word RNN with query attention 404. In an exemplary embodiment, the word RNN 402 receives a sequence of encoded words output by a word encoder module (e.g., one of the word encoder modules 306-308), where the sequence of encoded words is encoded word 1-B. The word RNN 402 outputs a sequence of fixed-length vectors that represents encoded words 1-B, wherein each vector represents a word in a fragment, with context in which the word appears represented in the vector. The word RNN with query attention 404 receives such sequence of vectors and outputs another sequence of fixed-length vectors, wherein the word RNN with query attention 404 can include an attention mechanism that attends to output of the query RNN 314. Hence, the another sequence of vectors is a further encoding of the words of the fragment, with attention given to the words of the query as encoded by the query RNN 314.

As noted above, the sentence embedder system 400 can include one of the word RNN 402 or the word RNN with query attention 404, or can include both of such RNNs. Moreover, when the sentence embedder system 400 includes both RNNs, the word RNN with query attention 404 can receive output of the word RNN 402, or the word RNN 402 can receive output of the word RNN with query attention 404. The sentence embedder system 310 also includes a concatenator module 406 that receives a sequence of vectors output by one of the word RNN 402 or the word RNN with query attention 404, and forms a vector of fixed length that is an encoding of the fragment that includes words encoded by the encoded words 1-B. For example, the concatenator module 406 can employ max-mean pooling with respect to the received sequence of vectors to construct the vector of fixed-length, wherein such vector of fixed-length is output to one of the RNNs 316-320. The RNNs of the constructor module 124 can be or include any suitable type of RNN, including a Long Short-Term Memory (LSTM) RNN, a Gated Recurrent Unit (GRN), etc.

Exemplary training of the constructor module 124 is now briefly described. Initially, a set of examples is acquired, wherein each example includes a query, a webpage, and an indication as to whether each fragment of the document is an appropriate header, first list element, second list element, and so forth. To acquire this set of examples, queries are extracted from a query log of the search engine 318, and these queries are provided to the search engine 318. The search engine 318, with respect to one or more of the queries, can output answers in the form of lists using the conventional approach described above (where the search engine 318 searches an index of answers and returns an answer generated offline). With respect to a query, when the search engine 318 returns an answer upon receipt of the query, a threshold number of the most highly ranked webpages identified by the search engine 318 based upon the query are retrieved. The list answer is mapped back to each retrieved webpage, and a label is assigned to each fragment of the retrieved webpage depending upon whether the fragment is included as part of the answer (e.g., as the header or a list element in the answer). For instance, a label can be assigned to a fragment that indicates that the sentence is a header of the answer, a first list element of the answer, unknown, or not part of an answer. In addition, manually annotated training data can be acquired.

The objective function for training the constructor module 124 is now described. The constructor module 124 computes probabilities for each list element in a list answer. For purposes of explanation, a header of the list answer is set forth as an example. Whether a fragment in a webpage is suitable for use as a header can be treated as a classification problem. If it is assumed that there are N fragments in a webpage representation, for the header of the answer there are a total of N+1 labels (one label for each sentence fragment and a "no answer" label): $\{0, 1, \ldots, N-1, \infty\}$. If the label is i with $0 \le i < N$, such label indicates that the header is the ith fragment of the webpage representation. If the label is co, such label indicates that none of the N fragments of the webpage representation is suitable as a header. These N+1 labels are exclusive and exhausted if it is assumed that only one sentence can be the header of the answer. For example, i can denote the label and f(i) can denote the log it produced by the constructor module 124. In such a scenario, there are three cases for the objective function.

In the first case, a known header is mapped back to the webpage representation. In such case, multiple fragments can be matched, but it is unknown as to which fragment is actually picked by the search engine 318. Hence, the objective for this header can be written as:

$$\log \frac{\sum_{i \in L} e^{f(i)}}{\sum_{\forall j} e^{f(j)}},$$

where L contains all fragment indices that are matched to the returned header.

In the second case, no answer is returned for a webpage representation (i.e., there is no fragment that is a header for an answer in the webpage representation). The label that can be used for the header is equation co. The objective for this case is as follows:

$$\log \frac{e^{f(\infty)}}{\sum_{\forall j} e^{f(j)}}.$$

In the third case, a fragment $i^b$ is labeled as being improper for use as the header by a human labeler. In such case, it is known that the labeled fragment is not a suitable header of an answer, but it is unknown as to whether other fragments in the webpage representation can be the header of the answer. Thus, in the third case, all labels except $i^b$ are missing, and the objective is:

$$\log \frac{\sum_{i \ne i^b} e^{f(i)}}{\sum_{\forall j} e^{f(j)}}.$$

Probabilities of fragments being a header other than fragment $i^b$ are increased. In an example for training a learning rate of 0.0005 and 8.9 dropout rate were used. Variational dropout was used for attention mechanisms.

Figure 5:
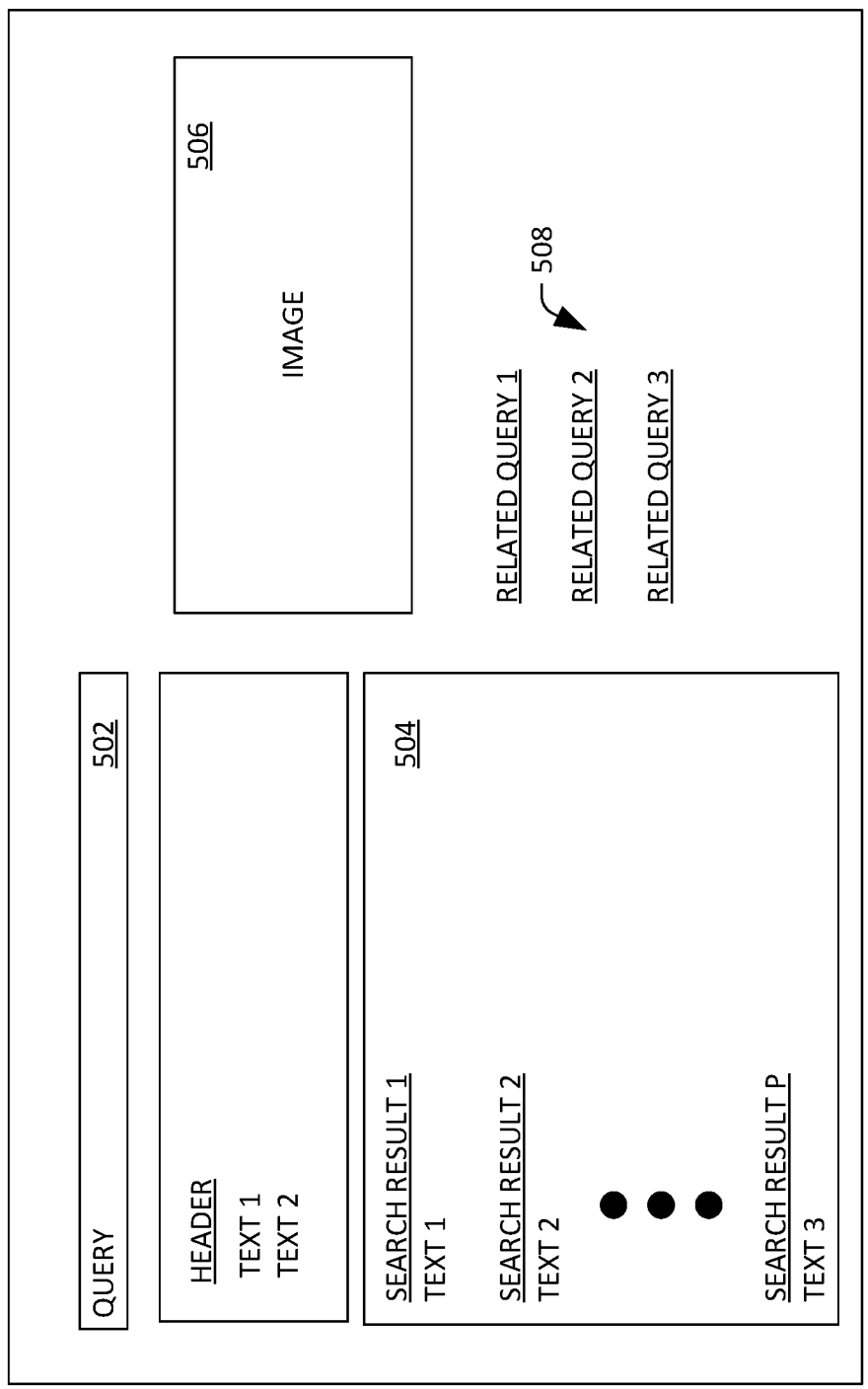
FIG. 5 depicts an exemplary search engine results page (SERP).

With reference now to FIG. 5, an exemplary SERP 500 that includes an answer generated by the answer generator system 120 is illustrated. The SERP includes a query field 502, which can depict a query set forth by the user 126 of the client computing device 104 and can receive a new query from the user 126 of the client computing device 104. The SERP 500 includes a search results field 504 that comprises a list of webpages identified by the search engine 118 as being relevant to the query set forth in the query field 502. Optionally, the SERP 500 comprises an image 506 identified by the search engine 118 as being relevant to the query. The SERP 500 may also include a list of query suggestions 508. Finally, the SERP 500 can comprise an answer field 510 that depicts an answer generated by the answer generator system 120 in a manner that is described above. The exemplary answer field 510 includes a list header, a first list element, and a second list element. For instance, when the query set forth in the query field 502 is "most home runs in 2019", the header is a first fragment extracted from a webpage representation (e.g., "home runs 2019"), the first list element is a second fragment extracted from the webpage representation (e.g., "John Smith 34 home runs"), and the second list element is a second fragment extracted from the webpage representation (e.g., "John Doe 32 home runs").

Figure 6:
FIG. 6 illustrates extraction of fragments from a table in a webpage.

Referring to FIG. 6, a schematic that depicts fragments in a table in a webpage is presented. In this example, a webpage representation 600 includes a table that comprises five rows and six columns. The answer generator system 120 can treat each row of the table as an independent fragment. Thus, the sequence of words "player", "team", "position", "games", "home runs", and "average" in the first row of the webpage representation 600 is treated as a first fragment, the sequence of words/numbers "player A", "team 1", "1B", "45", "5", and "0.289" is treated as a second fragment, and so forth. With respect to the exemplary query "most home runs in 2019", the constructor module 124, in this example, can output the first row of the table as the first row of a table answer, can output row 4 of the table as a second row of the table answer, and can output row 3 as the third row of the table answer. Accordingly, the user who issued the query can readily ascertain that player C and player B have the most home runs in 2019 without having to leave a SERP.

Figure 7:
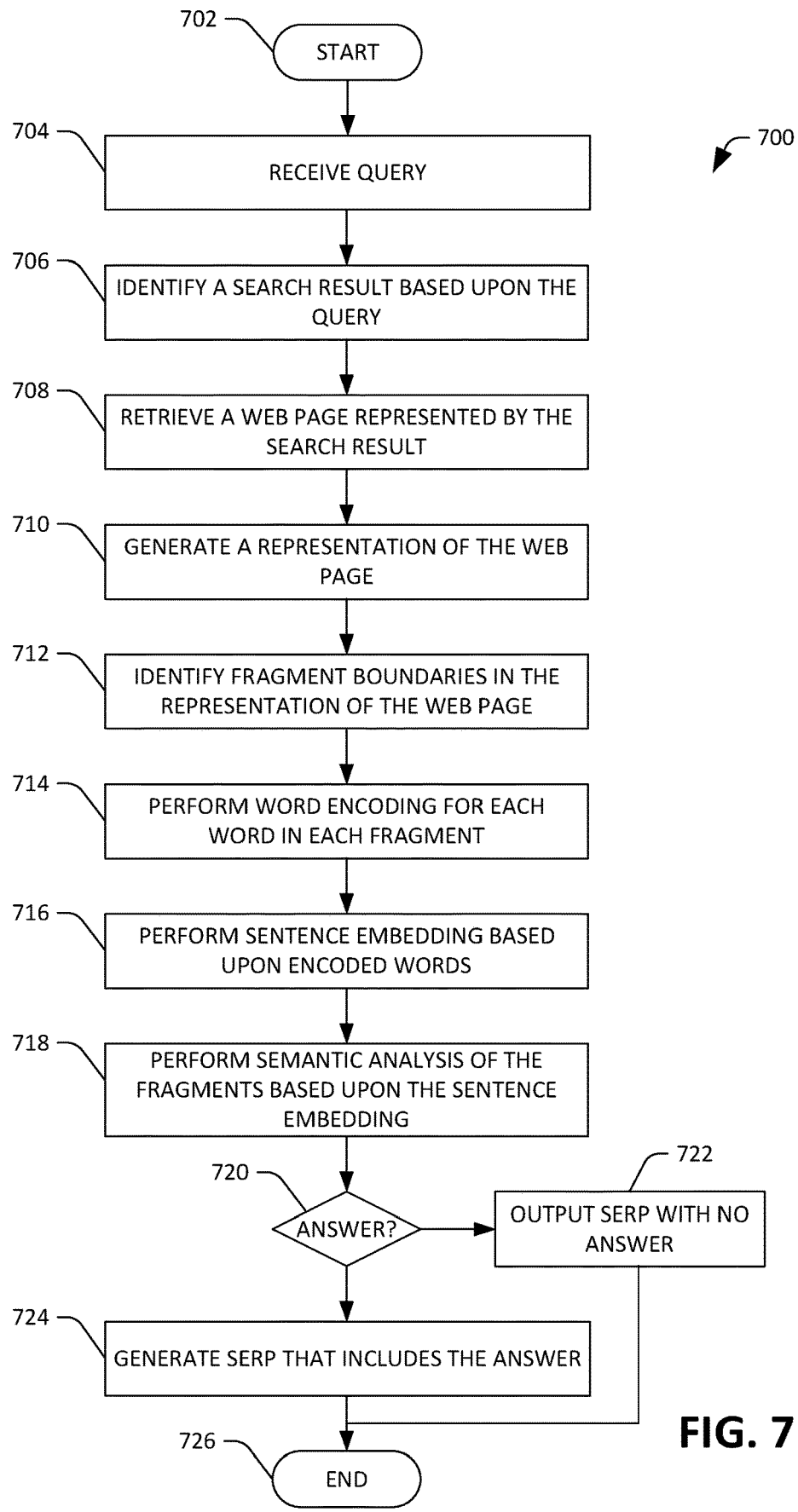
FIG. 7 is a flow diagram illustrating an exemplary methodology that facilitates generation of a SERP that includes an answer to a query.

FIG. 7 illustrates an exemplary methodology relating to constructing an answer based upon content of a webpage. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates an exemplary methodology 700 for generating a SERP that includes an answer in list form is illustrated. The methodology 700 starts at 702, and at 704 a query is received from a client computing device. At 706, a webpage is identified by a search engine based upon the query, wherein, for example, the webpage can be a most highly ranked webpage by the search engine with respect to the received query.

At 708, the webpage identified at 706 is retrieved. For instance, the webpage can be retrieved from a web server that hosts the webpage or can be retrieved from a search engine cache. At 710 a representation of the webpage is generated, wherein the representation of the webpage is generated based upon at least one webpage partition rule. As noted previously, the representation of the webpage may include less than an entirety of the webpage. At 712, fragment boundaries in the representation of the webpage are identified. For example, the fragment boundaries can be identified based upon table rows, punctuation, paragraph breaks, line breaks, tags in HTML code of the webpage, section breaks, etc.

At 714, word encoding is performed for each word in each fragment of the webpage representation. Thus, at 714 each fragment is represented by a sequence of encoded words. At 716, sentence embedding is performed based upon the words encoded at 714. Put differently, at 716 each encoded word is further encoded based upon the context in which the word occurs in the fragment, and these further encoded words are concatenated to form a fixed length vector that represents semantic meaning of the fragment (when considered by itself). At 718 semantic analysis of the fragments is performed based upon the sentence embedding undertaken at 716. In other words, the encoded fragments are further encoded to take into consideration the context in which the fragment occurs in the webpage representation. These further encoded fragments are compared with the received query to ascertain whether each encoded fragment is suitable as a header of an answer, a first list element of the answer, second list element of the answer, and so forth.

At 720 a determination is made as to whether the representation of the webpage includes a suitable answer for the query. As described previously, the constructor module 124 can dynamically determine a "length" (e.g., a number of list elements or table rows) that an answer includes. More specifically, the constructor module 124 can, for a header portion of an answer, determine a probability that there is no fragment in a webpage representation that is suitable as the header portion of the answer. When the probability is above a threshold, the constructor module 124 can output an indication that a webpage representation does not include an answer. When the probability is below a threshold, the constructor module 124 can, for a first list element of the answer, determine a probability that there is no fragment in the webpage representation that is suitable as the first list element of the answer. If the representation of the webpage does not include a suitable answer, then at 722 a SERP is generated that includes no answer and the SERP is transmitted to the client computing device from which the query was received. If at 720 it is determined that the webpage representation includes a suitable answer, then at 724 a SERP is generated that includes such answer and the SERP is transmitted to the client computing device. The methodology 700 completes at 726.

It is again to be noted that while the examples described herein pertain to search engines that identify webpages that are relevant to the query, the technologies described herein are not limited to such web-based search engines. The technologies described herein are equally well-suited for constructing answers to queries executed over other types of documents, such as files retained in a file system, email documents, social media messages, and the like. Moreover, while the examples set forth herein have indicated that the answer is displayed on a display, other approaches for presenting an answer to a user are contemplated. For example, a user can set forth a voice query to a smart speaker, and the smart speaker can audibly return the answer to the user, wherein the answer is constructed by the constructor module 124.

Figure 8:
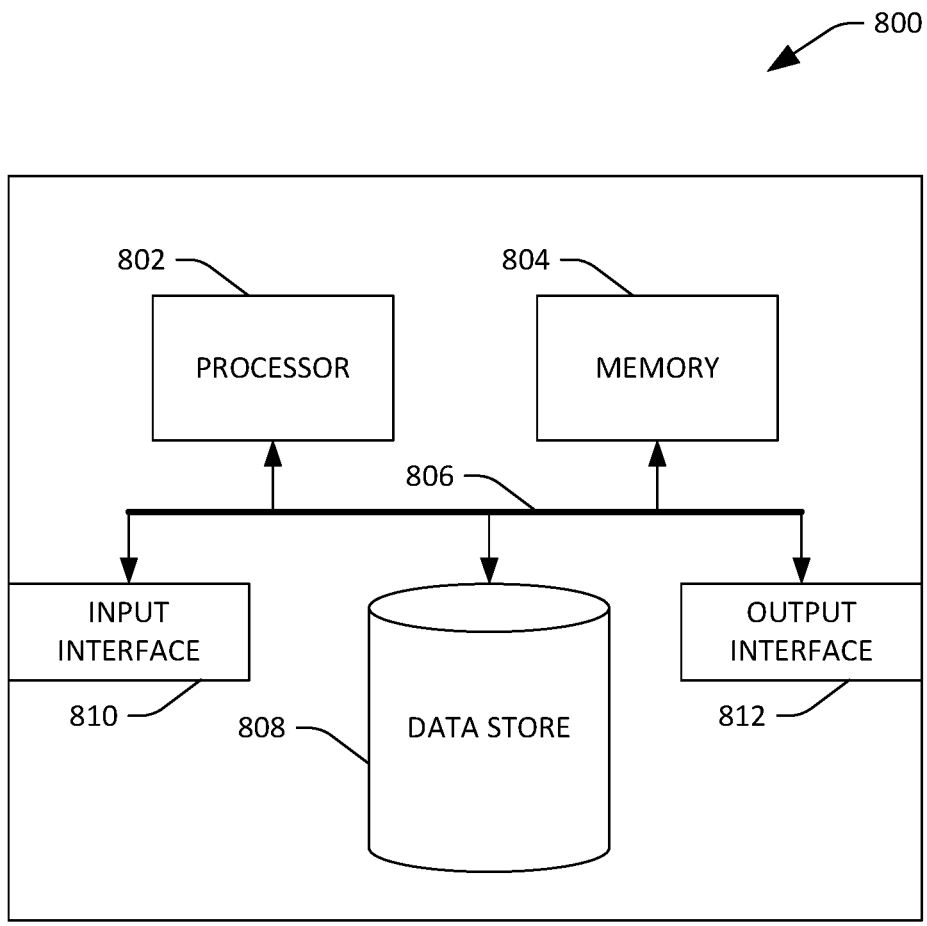
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that constructs answers to queries based upon content of documents, wherein the answers are in list form. By way of another example, the computing device 800 can be used in a system that supports training a deep model that is used in connection with constructing answers to queries in list form. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store webpages, representations of webpages, encodings, etc.

The computing device 800 additionally includes a data store 808 that is accessible by the processor 802 by way of the system bus 806. The data store 808 may include executable instructions, webpages, emails, webpage representations, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a processor of a computing system, the method comprising:
    obtaining a webpage that is indexed in a computer-readable search engine index, wherein the webpage comprises first text, second text, and third text, and further wherein the third text is between the first text and the second text in the webpage;
    constructing a list answer based upon the webpage, wherein the list answer comprises a plurality of elements in list form, the plurality of elements comprising:
        a first element that comprises the first text of the webpage; and
        a second element that comprises the second text of the webpage, wherein the first element and the second element are adjacent to one another in the list answer;
    subsequent to creating the list answer, receiving a query from a client computing device that is in network communication with the computing system;
    identifying the list answer based upon the query; and
    returning the list answer to the client computing device responsive to identifying the list answer.

2. The method of claim 1, wherein identifying the list answer based upon the query comprises:
    searching the computer-readable search engine index based upon the query;
    identifying the webpage based upon the searching of the computer-readable search engine index, wherein the list answer is identified based upon the webpage being identified based upon the query.

3. The method of claim 2, wherein several webpages are identified based upon the searching of the computer-readable search engine index, and further wherein identifying the list answer based upon the query further comprises:
    ranking the several webpages, wherein the list answer is identified based upon the ranking of the several webpages.

4. The method of claim 3, wherein the list answer is identified based upon the webpage being ranked in a top threshold number of webpages.

5. The method of claim 4, wherein the list answer is identified based upon the webpage being the most highly ranked webpage amongst the several webpages.

6. The method of claim 1, further comprising:
    prior to constructing the list answer based upon the webpage:
        generating a first representation of the webpage and a second representation of the webpage, wherein the first representation of the webpage and the second representation of the webpage are different from one another;
        providing the first representation of the webpage to a first computer-implemented deep model that is configured to construct answers to queries based upon text of webpage representations provided to the first computer-implemented deep model; and
        providing the second representation of the webpage to a second computer-implemented deep model that is configured to construct answers to queries based upon text of webpage representations provided to the second computer-implemented deep model, wherein the list answer is constructed by the first computer-implemented deep model based upon the first representation of the webpage.

7. The method of claim 6, wherein generating the first representation and the second representation of the webpage comprises:
    delineating a boundary between a first fragment and a second fragment in the webpage, wherein the first fragment is included in the first representation and the second fragment is included in the second representation.

8. The method of claim 6, wherein generating the first representation and the second representation of the webpage comprises:
    identifying a list tag in HyperText Markup Language (HTML) code of the webpage, wherein the first representation is generated based upon the list tag being identified in the HTML code.

9. The method of claim 6, wherein the second computer-implemented deep model constructs a second list answer based upon the second representation of the webpage, wherein the second list answer differs from the first list answer, the method further comprising:
    computing a first score for the list answer;
    computing a second score for the second list answer; and
    selecting the list answer based upon the first score relative to the second score.

10. The method of claim 6, wherein the first representation of the webpage comprises a first fragment and a second fragment, wherein the first fragment is the first text and has a first plurality of words and the second fragment is the second text and has a second plurality of words, and further wherein constructing the list answer comprises:
    encoding the first fragment as a first vector, wherein the first vector represents semantic meaning of the first fragment; and
    encoding the second fragment as a second vector, wherein the second vector represents semantic meaning of the second fragment, wherein the first vector and the second vector are of a same length, and further wherein the list answer is constructed based upon the first vector and the second vector.

11. The method of claim 10, wherein constructing the list answer further comprises:
    providing the first vector and the second vector as sequential input to a recurrent neural network (RNN); and generating, by the RNN, sequential output that includes a third vector and a fourth vector, wherein the third vector represents the first fragment and the fourth vector represents the second fragment, and further wherein the list answer is constructed based upon the third vector and the fourth vector.

12. The method of claim 11, wherein constructing the list answer further comprises:
providing the third vector and the fourth vector as sequential input to a second RNN, wherein the second RNN attends to an encoding of the query; and
generating, by the second RNN, sequential output that includes a fifth vector and a sixth vector, wherein the fifth vector represents the first fragment and the sixth vector represents the second fragment, and further wherein the list answer is constructed based upon the fifth vector and the sixth vector.

13. The method of claim 12, wherein constructing the list answer further comprises:
providing the fifth vector and the sixth vector as sequential input to a third RNN, wherein self attention is employed in the third RNN; and
generating, by the third RNN, sequential output that includes a seventh vector and an eighth vector, wherein the seventh vector represents the first fragment and the eighth vector represents the second fragment, and further wherein the list answer is constructed based upon the seventh vector and the eighth vector.

14. The method of claim 1, wherein the list answer is included in a search engine results page (SERP) returned to the client computing device.

15. The method of claim 14, wherein the SERP additionally includes a hyperlink that points to the webpage.

16. A computing system that comprises:
a processor; and
memory storing instructions that, when executed by the processor, cause the processor to perform acts comprising:
obtaining a webpage;
constructing a list answer based upon content of the webpage, wherein the webpage comprises first text, second text, and third text, wherein the third text is between the first text and the second text in the webpage, and further wherein the list answer comprises:
a first list entry that comprises the first text; and
a second list entry that comprises the second text, wherein the first list entry and the second list entry are adjacent to one another in the list answer;
subsequent to constructing the list answer, receiving a query from a client computing device that is in network communication with the computing system;
determining that the list answer is relevant to the query; and
based upon determining that the list answer is relevant to the query, returning the list answer to the client computing device.

17. The computing system of claim 16, wherein determining that the list answer is relevant to the query comprises:
searching a computer-readable search engine index based upon the query; and
identifying the webpage based upon the searching of the computer-readable index, wherein the list answer is determined to be relevant to the query based upon the webpage being identified.

18. The computing system of claim 17, wherein the webpage is amongst several webpages identified based upon the searching of the computer-readable index, and further wherein determining that the list answer is relevant to the query comprises:
ranking the several webpages to form a ranked list of webpages, wherein the list answer is determined to be relevant to the query based upon a position of the webpage in the ranked list of webpages.

19. The computing system of claim 17, wherein a hyperlink to the webpage and the list answer are returned to the client computing device in a search engine results page (SERP).

20. A computer-readable storage medium comprising instructions that, when executed by a processor, cause the processor to perform acts comprising:
obtaining a webpage, wherein the webpage comprises first text, second text, and third text, and further wherein the third text is between the first text and the second text in the webpage;
constructing a list answer that comprises several list entries based upon the webpage, wherein the list entries comprise:
a first list entry that comprises the first text; and
a second list entry that comprises the second text, where the first list entry and the second list entry are adjacent to one another in the list answer;
subsequent to constructing the list answer:
receiving a query from a client computing device;
determining that the webpage is relevant to the query; and
returning the list answer to the client computing device as part of a search engine results page (SERP) based upon determining that the webpage is relevant to the query.

* * * * *